US012025022B2

(12) United States Patent
Triana Zorsano et al.

(10) Patent No.: US 12,025,022 B2
(45) Date of Patent: Jul. 2, 2024

(54) TOOLING ASSEMBLY AND METHOD FOR REMOVAL OF A ROTOR BLADE

(71) Applicant: General Electric Company, Schenectady, NY (US)

(72) Inventors: Rubi Elizabeth Triana Zorsano, San Pedro Garza Garcia (MX); Gilberto Betancourt Salinas, Tonala (MX); Thomas Alan Mogle, II, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/734,466

(22) Filed: May 2, 2022

(65) Prior Publication Data

US 2023/0349305 A1 Nov. 2, 2023

(51) Int. Cl.
*F01D 25/28* (2006.01)

(52) U.S. Cl.
CPC ........ *F01D 25/285* (2013.01); *F05D 2230/70* (2013.01)

(58) Field of Classification Search
CPC ... B23P 19/025; F01D 25/285; F05D 2230/70
See application file for complete search history.

(56) References Cited

U.S. PATENT DOCUMENTS

| | | | | |
|---|---|---|---|---|
| 5,183,244 | A | 2/1993 | Ortolano et al. | |
| 7,353,588 | B2 | 4/2008 | Crain et al. | |
| 8,046,886 | B2 | 11/2011 | DeMania et al. | |
| 10,760,434 | B2 * | 9/2020 | Kolvick | F01D 5/30 |
| 2014/0304989 | A1 | 10/2014 | Lecuyer et al. | |
| 2020/0191003 | A9 * | 6/2020 | Kolvick | B25B 5/16 |

FOREIGN PATENT DOCUMENTS

| | | | | |
|---|---|---|---|---|
| EP | 2354456 | A2 | 8/2011 | |
| EP | 3477066 | A1 * | 5/2019 | F01D 25/285 |

* cited by examiner

*Primary Examiner* — Christopher J Besler
(74) *Attorney, Agent, or Firm* — Dority & Manning, P.A.

(57) ABSTRACT

Tooling assemblies and methods are provided. A tooling assembly includes a first plate, a second plate spaced apart from the first plate, and one or more members extending between the first plate and the second plate. The tooling assembly further includes a plurality of blocks mounted to the one or more members and arranged in one or more rows between the first plate and the second plate. The at least one block in the plurality of blocks defines an opening that corresponds with an exterior shape of a mounting portion of the rotor blade.

17 Claims, 9 Drawing Sheets

TOOLING ASSEMBLY AND METHOD FOR REMOVAL OF A ROTOR BLADE

FIELD

The present disclosure relates generally to turbomachine tooling assemblies and methods. In particular, the present disclosure is related to a tooling assembly and method for removal of one or more rotor blades in a series of rotor blades from a rotor disk.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typical turbomachines include both rotating components (such as rotor blades) coupled to the rotor shaft and non-rotating components (such as stator vanes or nozzles) coupled to the casing. Both the rotating components and the non-rotating components are typically removable and therefore include a suitable mounting portion that is configured to engage a complementary attachment slot in the perimeter of the rotor disk (for rotating components) or the casing (for non-rotating components). For example, the rotor disk may define a plurality of circumferentially spaced apart slots, each of which configured to receive the mounting portion of a rotor blade.

Generally, rotor blades include an airfoil extending from the mounting portion and having a complex geometric curvature or contour. When a complete ring of rotor blades is installed into a rotor disk, a single rotor blade in the ring cannot simply be removed because it would cause the airfoil of the removed rotor blade to collide/strike the neighboring airfoils of the neighboring rotor blades during removal (which could result in damage to the rotor blades).

Accordingly, an improved tooling assembly and method, that allows for one or more rotor blades in a series of neighboring rotor blades to be removed without causing damage to any rotor blade in the series of rotor blades, is desired and would be appreciated in the art.

BRIEF DESCRIPTION

Aspects and advantages of the tooling assemblies and methods in accordance with the present disclosure will be set forth in part in the following description, or may be obvious from the description, or may be learned through practice of the technology.

In accordance with one embodiment, a tooling assembly for removal of a rotor blade from a rotor disk of a turbomachine is provided. The tooling assembly includes a first plate, a second plate spaced apart from the first plate, and one or more members extending between the first plate and the second plate. The tooling assembly further includes a plurality of blocks mounted to the one or more members and arranged in one or more rows between the first plate and the second plate. The at least one block in the plurality of blocks defines an opening that corresponds with an exterior shape of a mounting portion of the rotor blade.

In accordance with another embodiment, a method of removing a rotor blade in a series of rotor blades from a rotor disk of a turbomachine using a tooling assembly is provided. The series of rotor blades include a first rotor blade, a last rotor blade, and one or more intermediate rotor blades. The method includes positioning the tooling assembly on a bearing casing proximate the rotor disk. The method further includes sliding a first rotor blade in the series of rotor blades partially out of a first slot in the rotor disk and partially into a first row of blocks. The method further includes sliding each rotor blade in the one or more intermediate rotor blades partially out of one or more intermediate slots in the rotor disk and partially into one or more intermediate rows of blocks. The method further includes sliding the last rotor blade in the series of rotor blade partially out of a last slot in the rotor disk and partially into a last row of blocks. The method further includes repeating the sliding steps until the first rotor blade is fully removed from the first slot and mounted in the first row of blocks.

These and other features, aspects and advantages of the present tooling assemblies and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present tooling assemblies and methods, including the best mode of making and using the present systems and methods, directed to one of ordinary skill in the art, is set forth in the specification, which makes reference to the appended figures, in which.

DETAILED DESCRIPTION

Figure 1:
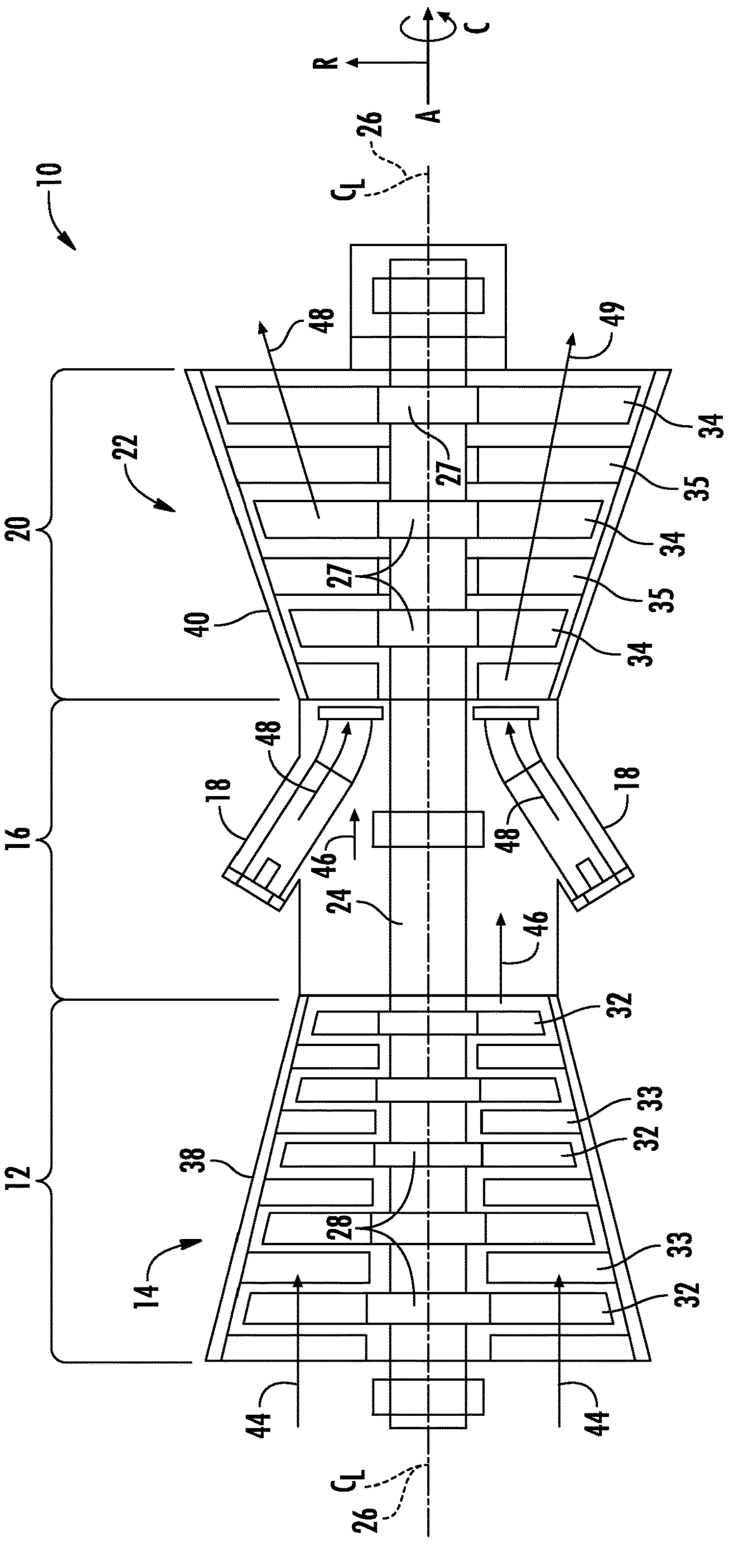
FIG. 1 is a schematic illustration of a turbomachine in accordance with embodiments of the present disclosure.

Reference now will be made in detail to embodiments of the present tooling assemblies and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components.

The term “fluid” may be a gas or a liquid. The term “fluid communication” means that a fluid is capable of making the connection between the areas specified.

As used herein, the terms “upstream” (or “forward”) and “downstream” (or “aft”) refer to the relative direction with respect to fluid flow in a fluid pathway. For example, “upstream” refers to the direction from which the fluid flows, and “downstream” refers to the direction to which the fluid flows. However, the terms “upstream” and “downstream” as used herein may also refer to a flow of electricity. The term “radially” refers to the relative direction that is substantially perpendicular to an axial centerline of a particular component, the term “axially” refers to the relative direction that is substantially parallel and/or coaxially aligned to an axial centerline of a particular component and the term “circumferentially” refers to the relative direction that extends around the axial centerline of a particular component.

Terms of approximation, such as “about,” “approximately,” “generally,” and “substantially,” are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, “generally vertical” includes directions within ten degrees of vertical in any direction, e.g., clockwise or counter-clockwise.

The terms “coupled,” “fixed,” “attached to,” and the like refer to both direct coupling, fixing, or attaching, as well as indirect coupling, fixing, or attaching through one or more intermediate components or features, unless otherwise specified herein. As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive- or and not to an exclusive- or. For example, a condition A or B is satisfied by any one of the following: A is true or present) and B is fake (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes a compressor section 12 including a compressor 14 disposed at an upstream end of the gas turbine 10, a combustion section 16 having at least one combustor 18 downstream from the compressor 14, and a turbine section 20 including a turbine 22 that is downstream from the combustion section 16. A shaft 24 extends along an axial centerline 26 of the gas turbine 10 at least partially through the compressor 14 and/or the turbine 22. In particular configurations, the shaft 24 may comprise of a plurality of individual shafts coupled to one another.

The compressor section 12 may generally include a plurality of rotor disks 28 and a plurality of rotor blades 32 extending radially outwardly from and connected to each rotor disk 28. Each rotor disk 28 in turn may be coupled to or form a portion of the shaft 24 that extends through the compressor section 12. The compressor section 12 further includes a casing 38 that circumferentially surrounds the portion of the shaft 24 and the rotor blades 32. Stator vanes 33 may be mounted to the casing 38. The rotor blades 32 and the stator vanes 33 may be arranged in an alternating manner, such that the stator vanes 33 are disposed between rotor blades 32.

The turbine section 20 may generally include a plurality of rotor disks 27 and a plurality of rotor blades 34 extending radially outwardly from and being interconnected to each rotor disk 27. Each rotor disk 27 in turn may be coupled to or form a portion of the shaft 24 that extends through the turbine section 20. The turbine section 20 further includes a turbine casing 40 that circumferentially surrounds the portion of the shaft 24 and the rotor blades 34, thereby at least partially defining a hot gas path 49 through the turbine section 20. Stationary turbine nozzles 35 may be mounted to the turbine casing 40. The rotor blades 34 and stationary turbine nozzles 35 may be arranged in an alternating manner, such that the stationary turbine nozzles 35 are disposed between rotor blades 34.

In operation, a working fluid 44 such as air is routed into the compressor 14 where it is progressively compressed in part by the rotor blades 32 as it is routed towards the combustion section 16. A compressed working fluid 46 flows from the compressor 14 and is supplied to the combustion section 16. The compressed working fluid 46 is distributed to the combustors 18 where it is mixed with a fuel (not shown) to provide a combustible mixture. The combustible mixture is burned to produce combustion gases 48 at a relatively high temperature and high velocity. The combustion gases 48 are routed through the turbine 22 where thermal and kinetic energy is transferred to the rotor blades 34, thereby causing the shaft 24 to rotate. The mechanical rotational energy may be used to power the compressor section 12 and/or to generate electricity. For example, in particular applications, the shaft 24 is coupled to a generator (not shown) to produce electricity. The combustion gases 48 exiting the turbine section 20 may then be exhausted from the gas turbine 10 via an exhaust section.

The compressor 14 and the turbine 22 may each includes rotating components (such as the rotor blades 32, the rotor blades 34, or others) and non-rotating or stationary components (such as the stator vanes 33, the stationary turbine nozzles 35, or others). The rotating components may be coupled to the rotor disks 28, 27, such that the rotating components rotate with the shaft 24. The non-rotating components may be coupled to the casing (e.g., the casing 38 or the turbine casing 40) such that the non-rotating components are stationary during operation of the gas turbine 10. Both the rotating components and the non-rotating components may include mounting portions configured to engage a complementary circumferential slot defined in the perimeter of the rotor disk 28, 27 (for rotating components) or casing 38, 40 (for non-rotating components). The mounting portions may include a dovetail, hook, or other lateral protrusions received by the corresponding circumferential slot. For example, the circumferential slot may be defined in the casing 38, 40 for non-rotating components or the rotor disks 28, 27 for rotating components.

The gas turbine 10 may define a cylindrical coordinate system having an axial direction A extending along the axial centerline 26, a radial direction R perpendicular to the axial centerline 26, and a circumferential direction C extending around the axial centerline 26.

As shown in FIG. 1, a casing 38 generally surrounds the compressor 14 to contain a working fluid (e.g., air). The rotor blades 32 and stator vanes 33 may be arranged within the casing 38 in grouped stages 50 (e.g., a first stage, a second stage, a third stage, etc.) arranged serially such that the working fluid travels through the first stage before the second stage, and so on. The stages 50 of rotor blades 32 and stator vanes 33 progressively impart kinetic energy to the working fluid to produce a compressed working fluid at a highly energized state. Each rotor blade 32 may be circumferentially arranged around (and coupled to) the rotor disk 28 and may extend radially outward toward the casing 38. Conversely, each stator vane 33 may be circumferentially arranged around (and coupled to) the casing 38 and may extend radially inward toward a spacer disk 29 that separates adjacent stages of rotor blades 32.

Figure 2:
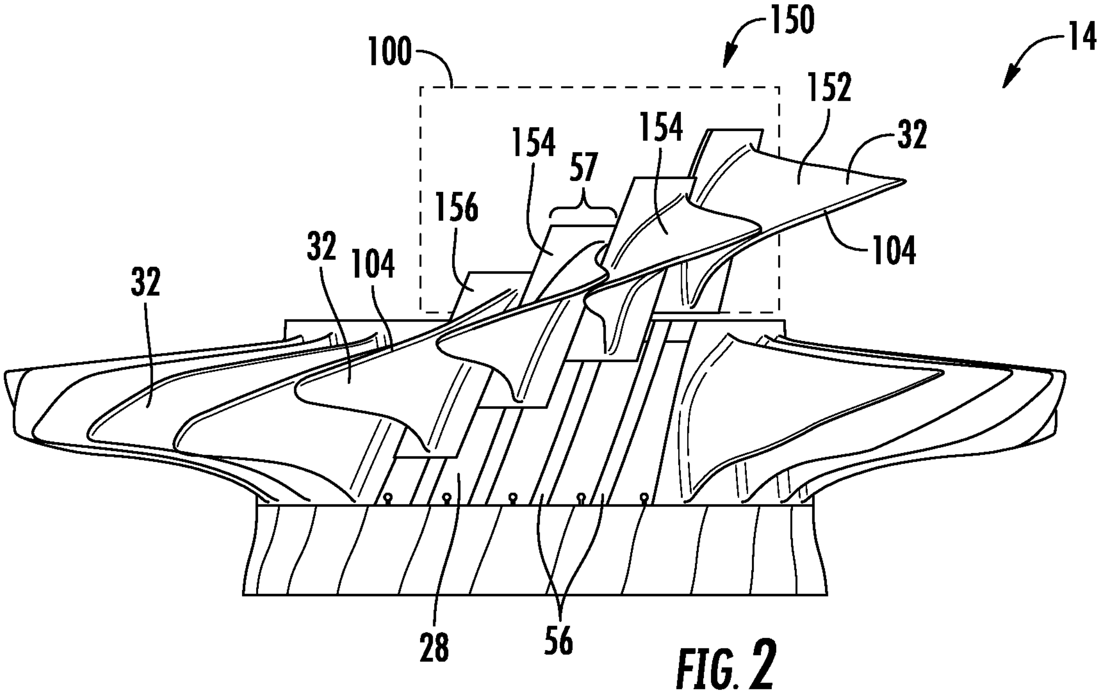
FIG. 2 illustrates a top-down view of a portion of a compressor and a tooling assembly in accordance with embodiments of the present disclosure.
Figure 3:
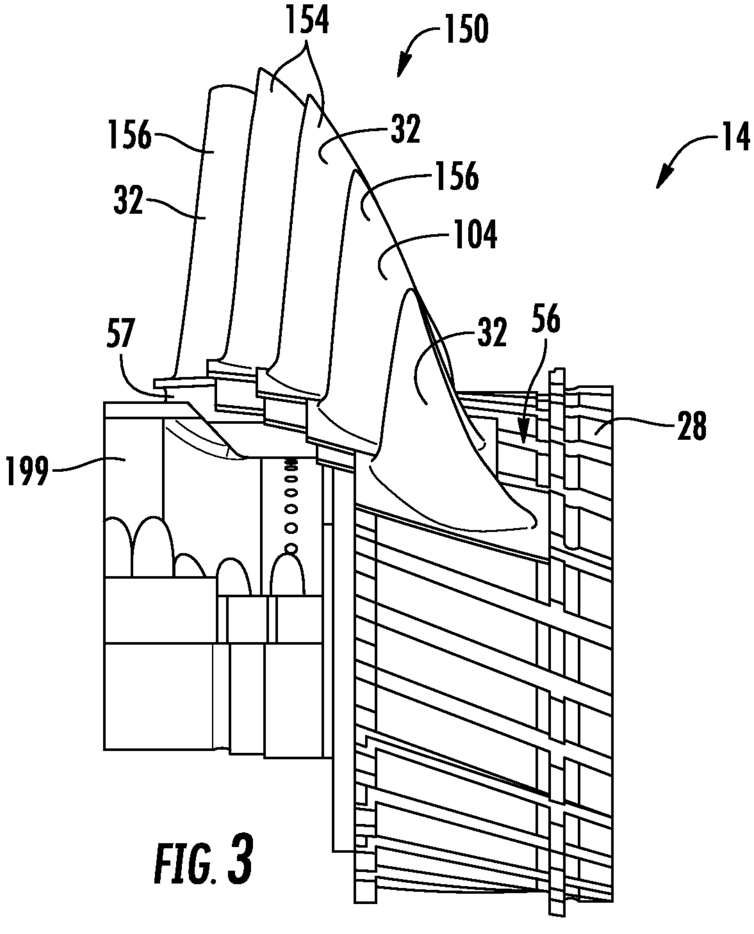
FIG. 3 illustrates a side view of a portion of a compressor in accordance with embodiments of the present disclosure.
Figure 4:
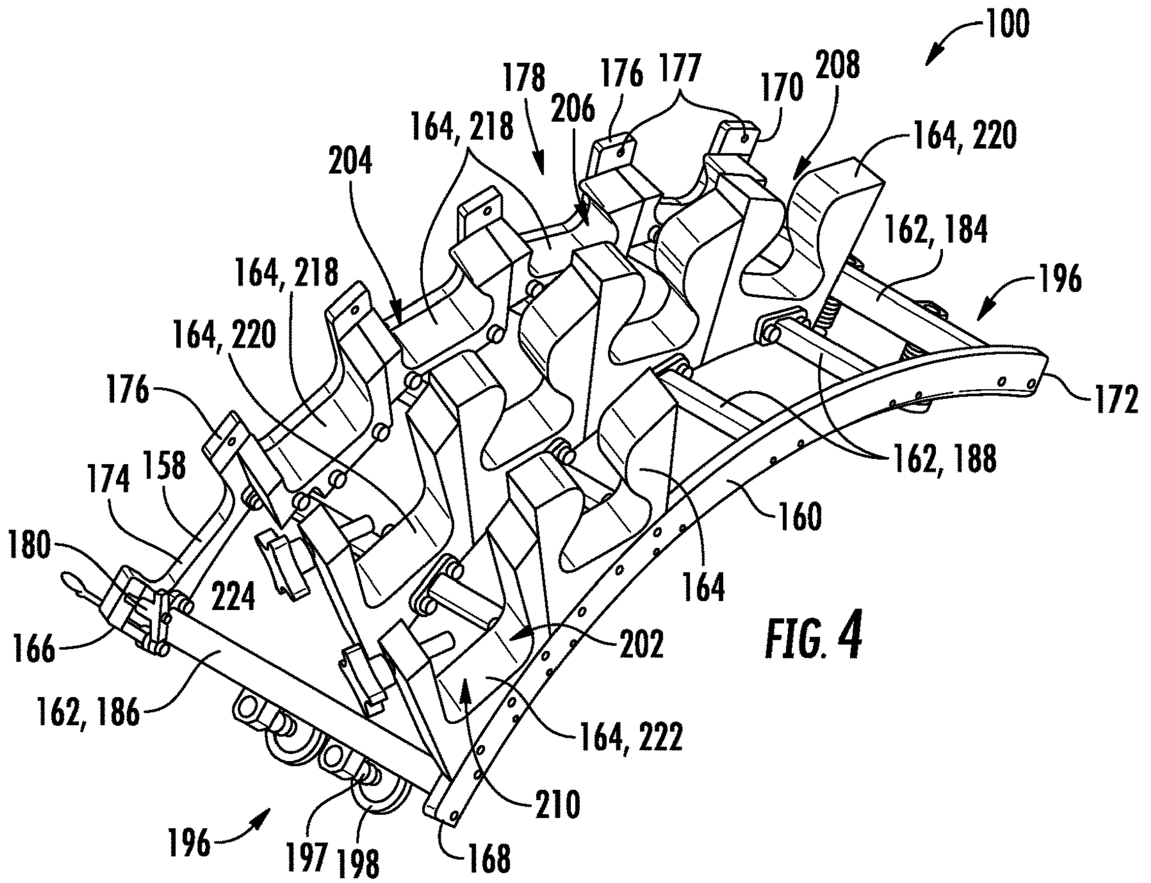
FIG. 4 illustrates a perspective view of a tooling assembly in accordance with embodiments of the present disclosure.
Figure 5:
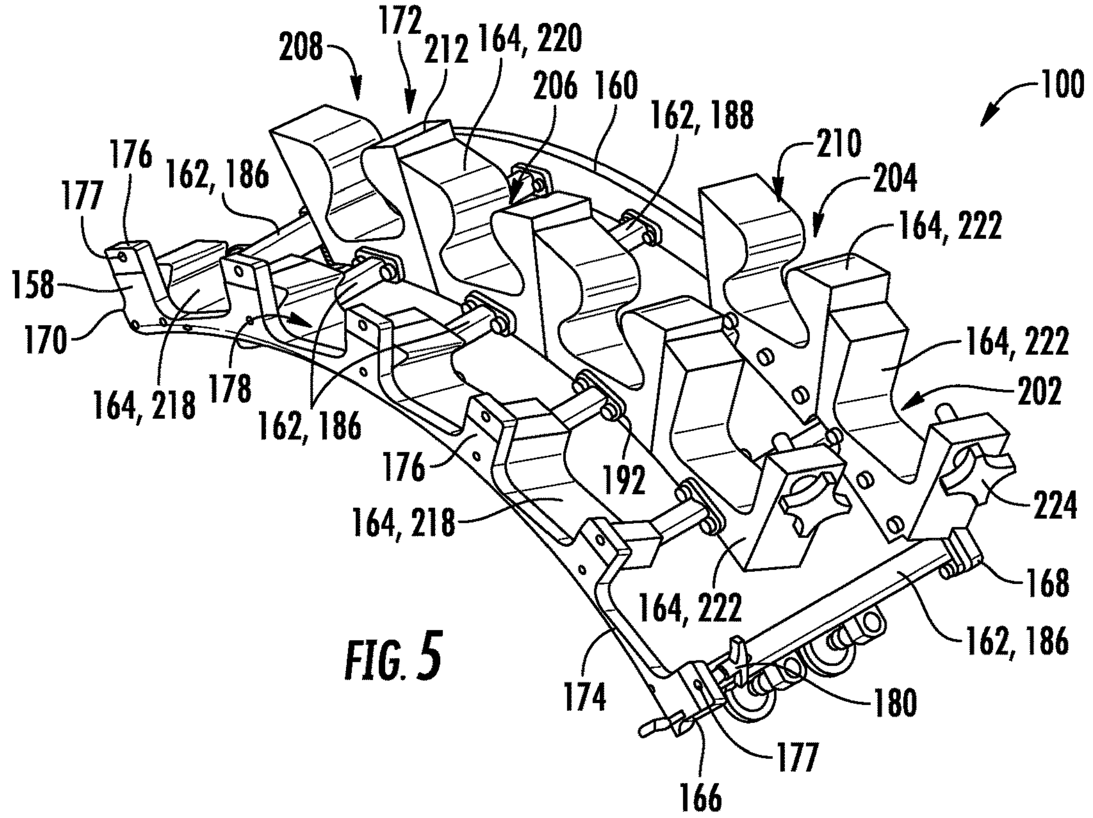
FIG. 5 illustrates a perspective view of a tooling assembly in accordance with embodiments of the present disclosure.

FIG. 2 illustrates a top down view of a portion of a compressor 14 and a tooling assembly 100 that facilitates the removal of at least one rotor blade 32 in a series of rotor blades 150, and FIG. 3 illustrates a side view of a portion of the compressor 14, in accordance with embodiments of the present disclosure. It should be appreciated that the tooling assembly 100 is illustrated as a dashed box in FIG. 2 in order to show details of the compressor 14. In exemplary implementations, the series of rotor blades 150 may be disposed in the first stage of the compressor 14, such that the tooling assembly 100 is used for removing one or more rotor blades 32 in the first stage of the compressor 14.

In many embodiments, the rotor blades 32 may each include a mounting portion 57, which is formed to connect and/or to secure the rotor blade 32 to the rotor disk 28 of the compressor 14. For example, the mounting portion 57 may include a T-shaped structure, a dovetail, a hook, one or more lateral protrusions, or any combination thereof. In exemplary embodiments, the mounting portion 57 may include a platform (from which the airfoil extends), a neck (extending from the platform), and a dovetail extending from the neck to a terminal end. The mounting portion 57 may be configured to mount into the rotor disk 28 in the axial direction A, the radial direction R, and/or a circumferential direction C. For example, the rotor disk 28 may define a plurality of slots 56 circumferentially spaced apart from one another. Each slot 56 may be sized and shaped to slidably receive a mounting portion 57 of a rotor blade 32, such that a singular rotor blade 32 is mounted within each slot 56. Each slot 56 may generally correspond with the shape of the mounting portion 57, such that the mounting portion 57 may be slidably inserted into the slot 56. Each slot 56 may extend along a direction that is generally oblique to the axial direction A. In other words, each slot 56 may extend between a first end and a second end that are axially separated from one another. The first end of the slot 56 and the second end of the slot 56 may be circumferentially offset from one another, and the slot 56 may extend in a generally straight line between the first end and the second end, such that the slot 56 is generally oblique to the axial direction A.

Each of the rotor blades 32 may include an airfoil 104 that extends radially outwardly from the mounting portion 57. Each airfoil 104 may include a complex geometric shape or contour along which the working fluid flows during operation of the compressor 14. For example, each airfoil 104 may include a leading edge, a trailing edge, a pressure side surface extending between the leading edge and the trailing edge, and a suction side surface extending between the leading edge and the trailing edge. Additionally, each airfoil 104 may extend radially from a base coupled to the mounting portion 57 to a tip.

When a compressor 14 is fully assembled, each rotor disk 28 may include an entire circumferential ring (e.g., 360° around the axial centerline 26 of the gas turbine 10) of rotor blades 32 mounted therein, with each rotor blade 32 in the circumferential ring of rotor blades 32 being installed into a respective slot 56. In this way, each rotor blade 32 in the circumferential ring of rotor blades 32 may directly neighbor two other rotor blades 32 in the circumferential ring of rotor blades 32.

Occasionally, one or more rotor blades 32 in the circumferential ring of rotor blades 32 may need to be removed (e.g., for maintenance or other reasons). However, because of the complex geometric contour of the airfoils 104, a singular rotor blade 32 in the circumferential ring of rotor blades 32 cannot be simply slidably removed because it would collide or strike the airfoils 104 of the neighboring rotor blades 32.

The tooling assembly 100 disclosed herein advantageously facilitates removal of one or more rotor blade 32 in a series of rotor blades 150 (or in a circumferential ring of rotor blades 32) without causing the airfoils 104 to collide or strike, thereby preventing damage to the airfoils 104. The series of rotor blades 150 may include one or more (or a plurality in some embodiments) circumferentially neighboring rotor blades 32 arranged in a rotor disk 28. The series of rotor blades 150 may form a portion of the entire circumferential ring of rotor blades 32. Particularly, the series of rotor blades 150 may include a first rotor blade 152 (or the removal rotor blade), one or more intermediate rotor blades 154, and a last rotor blade 156. In order to fully remove the first rotor blade 152 from the rotor disk 28 with the tooling assembly 100, all of the intermediate rotor blades 154 and the last rotor blade 156 must be partially removed from the rotor disk 28 (such that the intermediate rotor blades 154 and the last rotor blade 156 may be partially within the slot 56 and partially within the tooling assembly 100 during the removal of the first rotor blade 152).

While FIGS. 2 and 3 illustrate a series of rotor blades 150 having four rotor blades (a single first rotor blade 152, two intermediate rotor blades 154, and a single last rotor blade 156), it should be appreciated that the series of rotor blades 150 may include any suitable number of rotor blades, and present disclosure should not be limited to any particular number of rotor blade unless specifically recited in the claims.

Each rotor blade 32 in the series of rotor blades 150 must be at least partially removed from a respective slot 56 and into the tooling assembly 100 to fully remove the first rotor blade 152 in the series of rotor blades 150. For example, as shown in FIG. 2, in order to remove the first rotor blade 152 in the series of rotor blades, each rotor blade 32 in the series of rotor blades 150 must be progressively slid out in order from the first rotor blade 152 to the last rotor blade 156. Particularly, the first rotor blade 152 must be slid out of the slot 56 a first distance, the one or more intermediate rotor blades 154 must be slid out one or more intermediate distances each shorter than the last and each shorter than the first distance, and the last rotor blade 156 must be slid out a last distance shorter than the one or more intermediate distances and shorter than the first distance.

Figure 6:
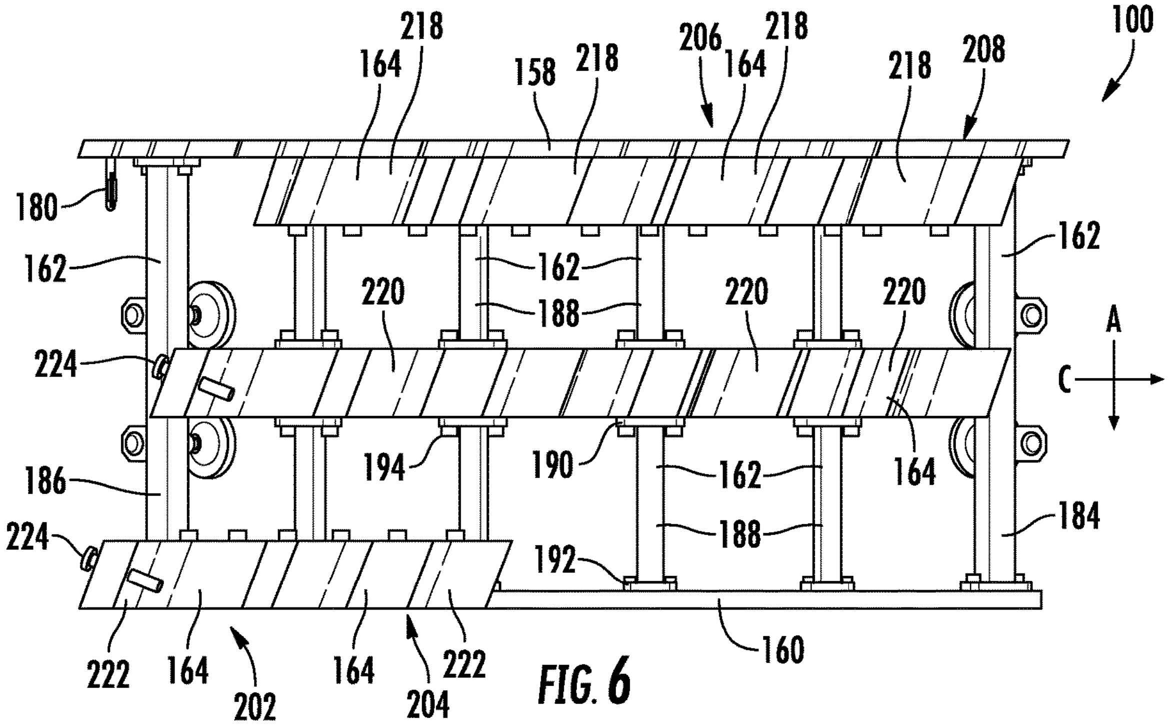
FIG. 6 illustrates a planar view of a tooling assembly from along a radial direction in accordance with embodiments of the present disclosure.
Figure 7:
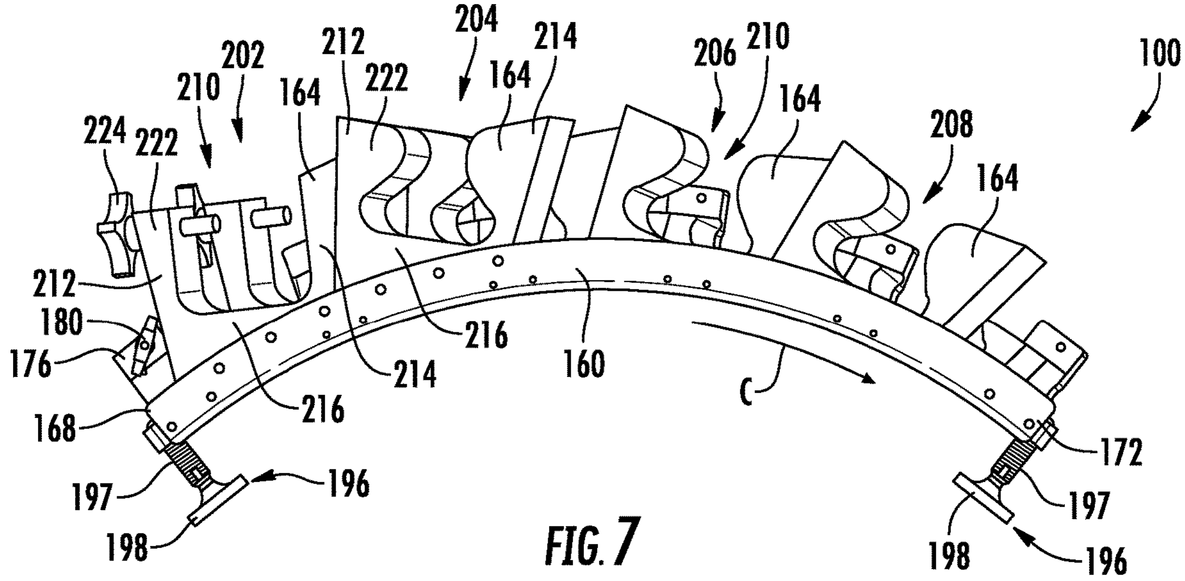
FIG. 7 illustrates a side view of a tooling assembly in accordance with embodiments of the present disclosure.
Figure 8:
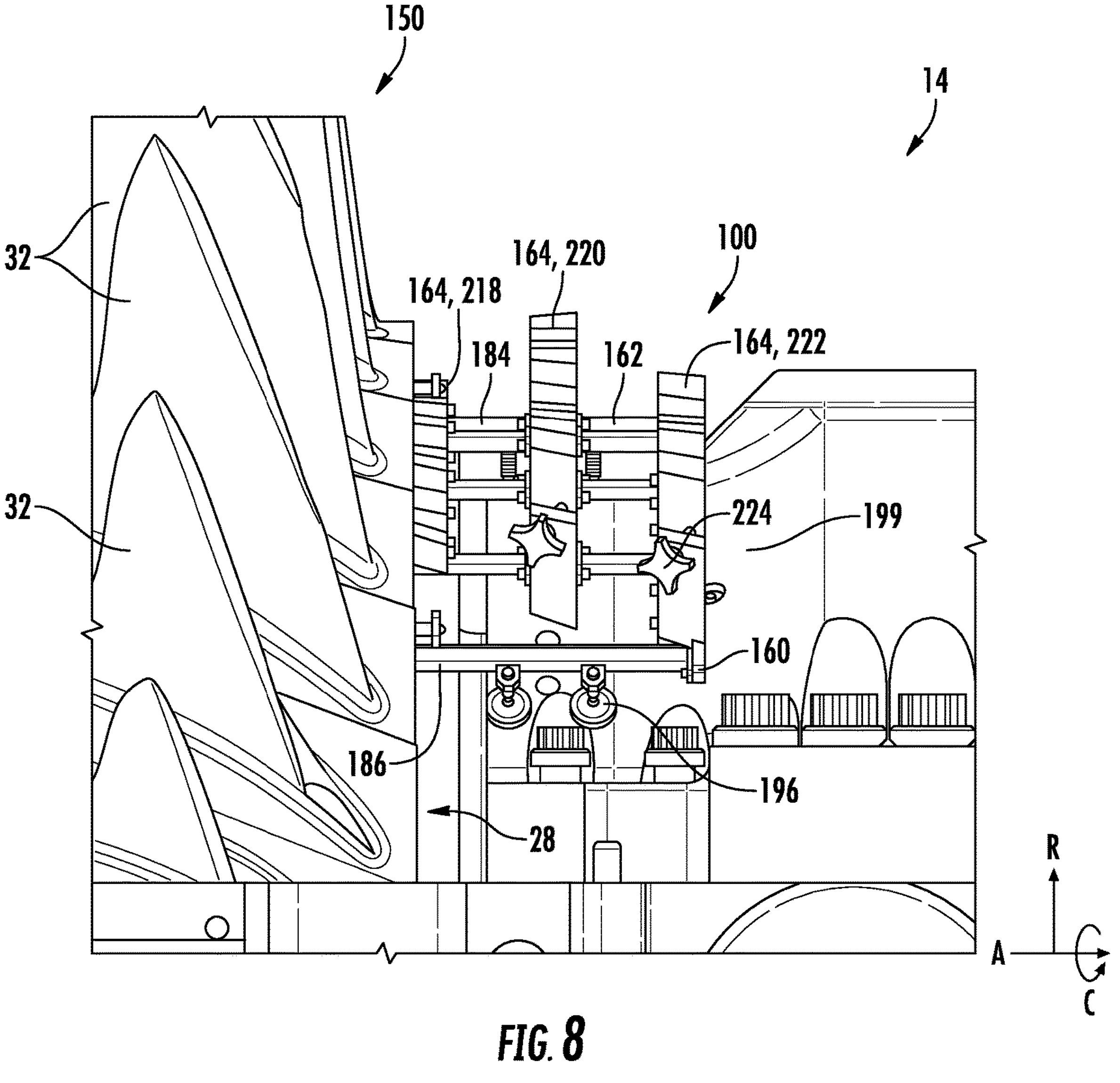
FIG. 8 illustrates a tooling assembly disposed in a removal position on a compressor in accordance with embodiments of the present disclosure.

FIGS. 4 through 7 illustrate various views of a tooling assembly 100 for removal of a rotor blade 32 from a rotor disk 28 of a turbomachine, in accordance with embodiments of the present disclosure. Particularly, FIGS. 4 and 5 each illustrate a perspective view of the tooling assembly 100, FIG. 6 illustrates a top down planar view of the tooling assembly 100, and FIG. 7 illustrates a side view of the tooling assembly 100, each of which in accordance with embodiments of the present disclosure. FIGS. 4 through 7 illustrate a cylindrical coordinate system of the tooling assembly 100 (e.g., having an axial direction A, a radial direction R, and a circumferential direction). The cylindrical coordinate system of the tooling assembly 100 may be the same as the cylindrical coordinate system of the gas turbine 10. For example, the cylindrical coordinate system of the tooling assembly 100 may align with the cylindrical coordinate system of the gas turbine 10 when the tooling assembly is mounted to a compressor 14 for removal of one or more rotor blades 32 (FIG. 8).

As shown in FIGS. 4 through 7, the tooling assembly 100 includes a first plate 158, a second plate 160, one or more members 162, and a plurality of blocks 164. The first plate 158 and the second plate 160 may be spaced apart from one another (e.g., axially spaced apart). The first plate 158 and the second plate 160 may extend generally circumferentially. The first plate 158 may include a main body 174 and one or more protrusions 176 extending radially from the main body 174. For example, the first plate 158 and the second plate 160 may each extend circumferentially from a first end 166, 168 to a second end 170, 172. For example, the first plate 158 (particularly the main body 174 of the first plate 158) may extend circumferentially from the first end 166 to the second end 170 of the first plate 158. Similarly, the second plate 160 may extend circumferentially from the first end 168 to the second end 172. The first plate 158 and the second plate 160 may be generally parallel to one another.

Figure 10:
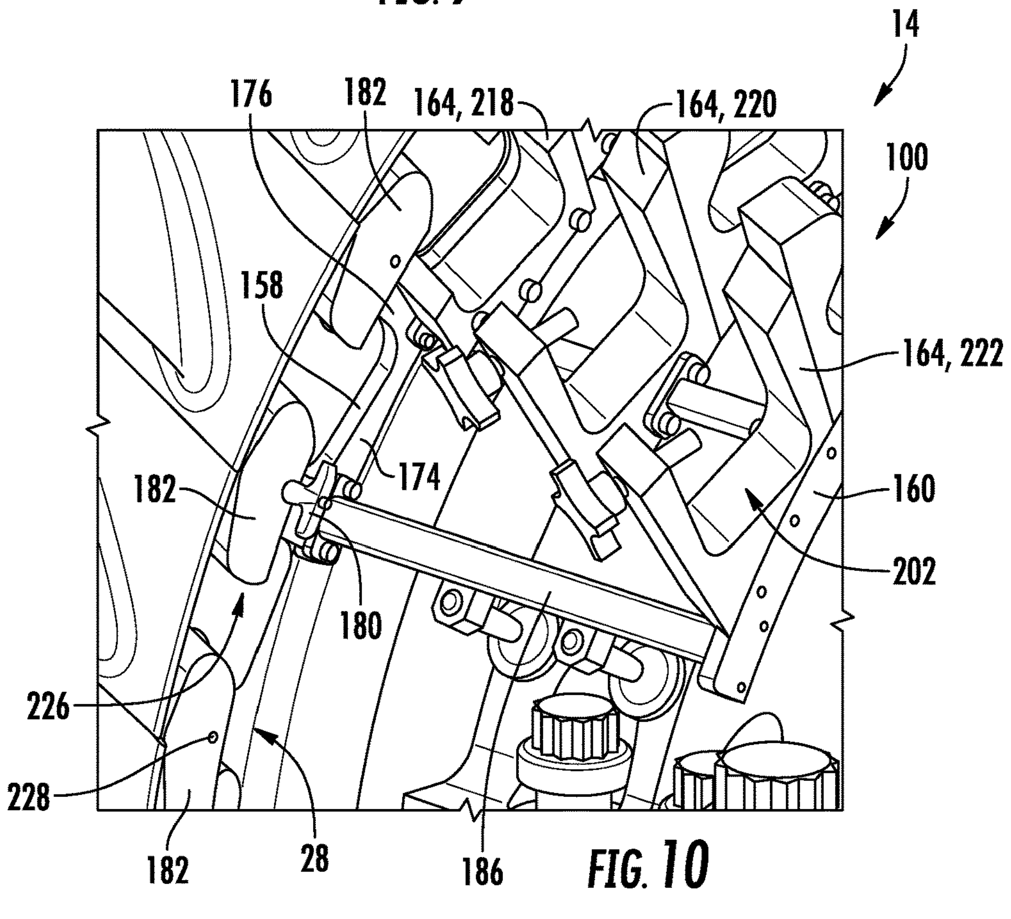
FIG. 10 illustrates an enlarged perspective view of a tooling assembly in an installed position, in accordance with embodiments of the present disclosure.

In many embodiments, the one or more protrusions 176 of the first plate 158 may be a plurality of protrusions 176 each circumferentially spaced apart such that a plurality of U-shaped openings 178 are defined by the main body 174 and the protrusions 176 of the first plate 158. Each of the protrusions 176 may extend radially from the main body 174 to a terminal end. In exemplary embodiments, one or more quick release pins 180 may extend through one of the first plate 158 or the second plate 160 to couple the tooling assembly 100 to the rotor disk 28. For example, the one or more quick release pins 180 may extend through a protrusion 176 of the one or more protrusions 176 to couple the tooling assembly 100 to a rotor disk 28. Particularly, the one or more of the protrusions 176 of the first plate 158 may define a hole 177, and the quick release pin 180 may be inserted through a hook 182 of rotor disk 28 and into the hole 177 defined in the first plate 158 to couple the tooling assembly 100 to the rotor disk while maintaining proper alignment of the tooling assembly 100 relative to the rotor blades 32 (FIG. 10). As shown, the quick release pin 180 may include a handle and a pin body extending form the handle to a terminal end.

In exemplary embodiments, the one or more members 162 may extend between the first plate 158 and the second plate 160. For example, the one or more members 162 may include a plurality of members 162 arranged between the first plate 158 and the second plate 160. Each of the members 162 may an elongated bar, rod, or other structure that extends between, and couples, two components together. In various embodiments, each of the members 162 may be an elongated rectangular bar that is hollow and extends between two flanges. Each of the members 162 may extend generally axially, and each of the members 162 may be generally perpendicular to the first plate 158 and the second plate 160.

In various embodiments, the one or more members 162 may include a first external member 184 and a second external member 186 each extending from the first plate 158 to the second plate 160. Particularly, the first external member 184 and the second external member 186 may each extend from an inner surface of the first plate 158 to an inner surface of the second plate 160. The second external member 186 may extend generally axially from the first end 166 of the first plate 158 to the first end 168 of the second plate 160. Similarly, the first external member 184 may extend generally axially from the second end 170 of the first plate 158 to the second end 172 of the second plate 160. In this way, the first plate 158, the second external member 186, the second plate 160, and the first external member 184 may form an outer a perimeter of the tooling assembly 100.

In many embodiments, the one or more members 162 may further include a plurality of row members 188 arranged between (e.g., axially between) the first plate 158 and the second plate 160 and between (e.g., circumferentially between) the second external member 186 and the first external member 184. In exemplary embodiments, each row member may be equal in length to the first external member 184 and the second external member 186, such that each of the row members 188 extend through the middle block 220. In such embodiments, each middle block 220 may be disposed around the row member 188, and the flanges 190, 192 may be welded to the row member 188 to secure the middle block 220 to the row member with one or more bolts 194 (e.g., screws). In this way, the blocks may lie over the steel structure created by the external members 184, 186, the row members 188, and the plates 158, 160, in order to guide the rotor blades during removal and avoid damage thereto. In an alternative embodiment, each row member 188 of the plurality of row members 188 may be shorter (e.g., axially shorter, such as about 50% axially shorter) than the second external member 186 and the first external member 184. Each row member 188 in the plurality of row members 188 may extend from one of a first block of the plurality of blocks 164, the first plate 158, or the second plate 160 to one of a second block of the plurality of blocks 164, the first plate 158, or the second plate 160. For example, as shown in FIGS. 4 through 7 collectively, at least one row member 188 may extend from the first plate 158 to a block of the plurality of blocks 164. In some embodiments, at least one row member 188 may extend from the second plate 160 to a block of the plurality of blocks 164. In various embodiments, at least one row member 188 may extend from a first block of the plurality of blocks 164 to a second block of the plurality of blocks 164.

In many embodiments, each of the members 162 may extend between a first flange 190 (or forward flange) and a second flange 192 (or aft flange). The first flange 190 may be coupled to one of the first plate 158 or a block of the plurality of blocks 164 via one or more bolts 194 (such as two threaded bolts that extend through the first flange 190). Similarly, second flange 192 may be coupled to the second plate 160 or a block of the plurality of blocks 164 via one or more bolts 194 (such as two threaded bolts that extend through the second flange 192).

In certain embodiments, the tooling assembly 100 may further include leveling feet 196 extending radially from at least one member 162 of the plurality of members 162. For example, the leveling feet 196 may extend radially the second external member 186 and the first external member 184 (e.g., radially inward). The leveling feet 196 may include a threaded rod 197 that is threadably coupled to the second external member 186 or the first external member 184 and a disk 198 disposed on a terminal end of the threaded rod 197. In exemplary embodiments, the tooling assembly 100 may include four leveling feet 196 (e.g., two coupled to the second external member 186 and two coupled to the first external member 184). The leveling feet 196 may allow for the tooling assembly 100 to rest on a circumferentially curved surface, such as the bearing casing 199.

In exemplary embodiments, a plurality of blocks 164 may be mounted to the one or more members 162 and arranged in one or more rows 202, 204, 206, 208 between the first plate 158 and the second plate 160. Each block 164 of the plurality of blocks 164 may define an opening 210. At least one block 164 in the plurality of blocks 164 may define opening 210 that corresponds with an exterior shape of a mounting portion 57 of the rotor blade 32.

the one or more rows 202, 204, 206, 208 may include a first row 202 of blocks 164, one or more intermediate rows (such as a second row 204 and a third row 206) of blocks 164, and a last row 208 of blocks. In many embodiments, the plurality of blocks 164 may be arranged in a first row 202, a second row 204, a third row 206, and a last row 208. While the tooling assembly 100 shown and described herein has a plurality of blocks 164 arranged in four rows 202, 204, 206, 208, it should be appreciated that the plurality of blocks 164 may be arranged in any suitable number of rows, and the present invention should not be limited to any particular number of rows unless specifically recited in the claims. However, in exemplary embodiments, four rows 202, 204, 206, 208 of blocks 164 may be particularly advantageous for the tooling assembly 100 because it allows for the safe removal of a rotor blade 32 while only requiring three (which is the minimum) other rotor blades 32 to be partially removed (e.g., into a respective row).

Each row 202, 204, 206, 208 of blocks 164 may include a forward block 218 coupled to the first plate 158 and a middle block 220 disposed between the first plate 158 and the second plate 160 (e.g., axially between, such as disposed on a centerline directly between the first plate 158 and the second plate 160). The first row 202 and the second row 204 may further include an aft block 222 coupled to the second plate 160. The forward block 218, the middle block 220, and the aft block 222 may be axially spaced apart from one another. In many embodiments, one or more members 162 may extend from the forward block 218 to the middle block 220 for a given row of blocks, and one or more members 162 may extend from the middle block 220 to the aft block 222 for a given row of blocks. In other embodiments, the one or more members 162 may pass through all the blocks 218, 220, 222 between the first plate 158 and the second plate 160.

Each block 164 of the plurality of blocks 164 may include a first side wall 212, a second side wall 214 spaced apart from the first side wall 212 (e.g., in the circumferential direction C), and a base 216 extending between the first side wall 212 and the second side wall 214. The side walls 212, 214 of the forward blocks 218 may be shorter than the side walls 212, 214 of the middle blocks 220 and/or the side walls 212, 214 of the aft blocks 222. The side walls 212, 214 of each block 164 in the first row 202 of blocks may extend straight (e.g., radially without a contoured interior surface), such that each block 164 in the first row 202 is generally U-shaped, thereby defining an opening 210 that is generally rectangularly shaped (e.g., with a single side missing). In contrast, side walls 212, 214 of each block 164 in the second row 204, the third row 206, and the last row 208 of blocks may include an interior contour that corresponds with an exterior shape of the mounting portion 57 of a rotor blade 32, such that each block 164 in the intermediate rows (e.g., the second row 204 and the third row 206) and each block 164 in the last row 208 defines an opening 210 that that corresponds with an exterior shape of a mounting portion 57 of the rotor blade 32. In this way, each block 164 in the second row 204, the third row 206, and the last row 208 may form an interference fit (or friction fit) with a rotor blade 32 that is being partially removed into the row of blocks, in order to secure the rotor blade 32 to the blocks 164 in the row.

In various embodiments, the first row 202 of blocks 164 may circumferentially neighbor one intermediate row (e.g., the second row 204) of blocks 164 of the one or more intermediate rows of blocks 164. In this way, the first row 202 may form a circumferentially outer row of blocks 164 of the tooling assembly 100. In exemplary embodiments, a locking pin 224 may extend through one or more blocks 164 of the plurality of blocks 164. The locking pin 224 may extend through a side wall 212, 214 of the blocks 164. Particularly, the locking pin 224 extend through one or more blocks 164 in the first row 202 of blocks 164, such as the middle block 220 in the first row 202 and the aft block 222 in the first row 202. The locking pin 224 may be threadably coupled to the block 164 through which it extends, such that it may removably secure a rotor blade 32 within the openings 210 of the blocks 164 for safe removal from the rotor disk 28.

FIG. 8 illustrates a tooling assembly 100 disposed in a removal position on a compressor 14, in accordance with one or more exemplary aspects of the present disclosure. For example, as shown in FIG. 8, the tooling assembly 100 may be positioned on a bearing casing 199 proximate the rotor disk 28 to remove one or more rotor blades 32 in the first stage of rotor blades 32. The leveling feet 196 may contact the bearing casing 199 and support the tooling assembly 100. The quick release pin 180 may extend through a hook 182 of the rotor disk 28 and into the first plate 158 of the tooling assembly 100 to couple the tooling assembly 100 to the compressor 14 for removal of one or more rotor blades 32. Each row 202, 204, 206, 208 may align with a respective rotor blade 32 in the rotor disk 28. More particularly, each row 202, 204, 206, 208 may align with a centerline of the slot 56 within which the rotor blade 32 is held, such that each rotor blade 32 may be slid out of the respective slot 56 and into a respective row 202, 204, 206, 208 of the tooling assembly 100.

Figure 9:
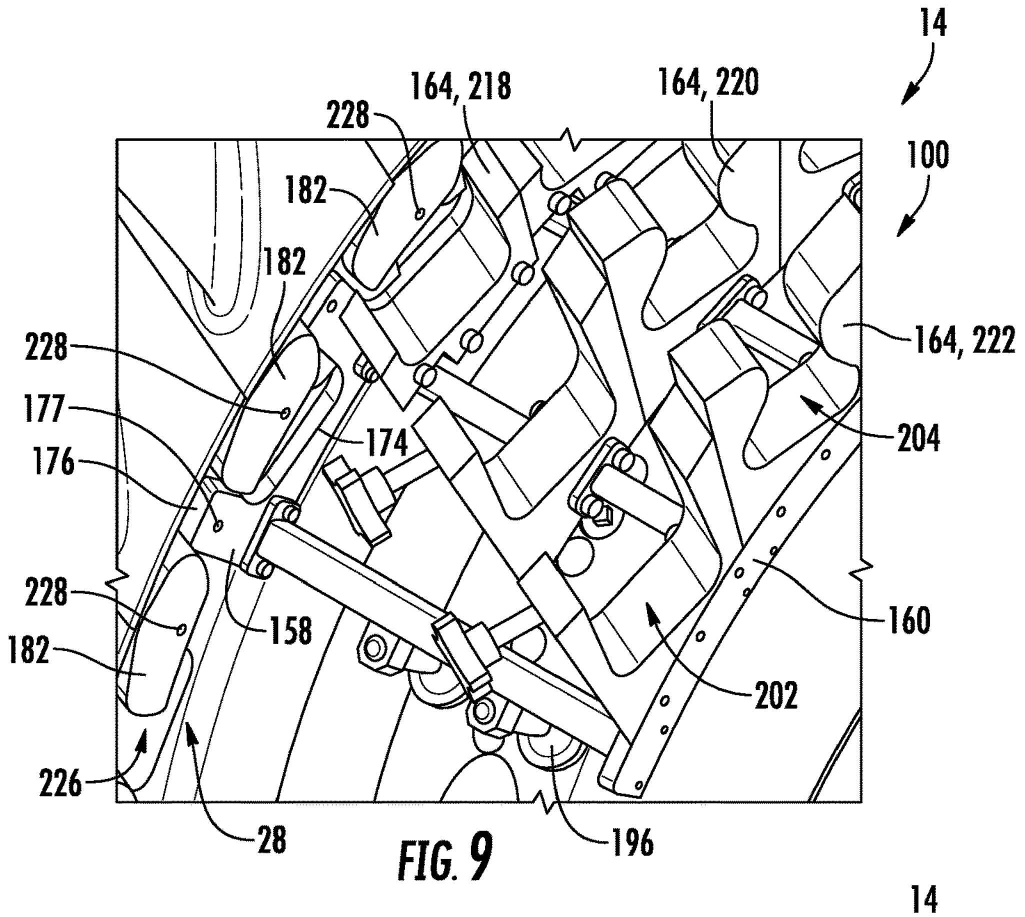
FIG. 9 illustrates an enlarged perspective view of a tooling assembly during installation of the tooling assembly onto a compressor in accordance with embodiments of the present disclosure

FIG. 9 illustrates an enlarged perspective view of a tooling assembly 100 during installation of the tooling assembly 100 onto a compressor 14, and FIG. 10 illustrates an enlarged perspective view of the tooling assembly 100 in an installed position, in accordance with embodiments of the present disclosure. As shown in FIGS. 9 and 10, the rotor disk 28 may include plurality of hooks 182 each defining a groove 226 and an aperture 228. As shown in FIG. 9, during the installation of the tooling assembly 100, the first plate 158 may be positioned such that the protrusions 176 are disposed between the hooks 182. Subsequently, as shown in FIG. 10, the tooling assembly 100 may be moved circumferentially such that the protrusion 176 is moved into the groove 226 until the hole 177 defined through the protrusion aligns with the aperture 228 defined through the hook. Next, the quick release pin 180 may be inserted through the aperture 228 and into the hole 177, thereby coupling the tooling assembly 100 to the rotor disk 28.

Figure 11:
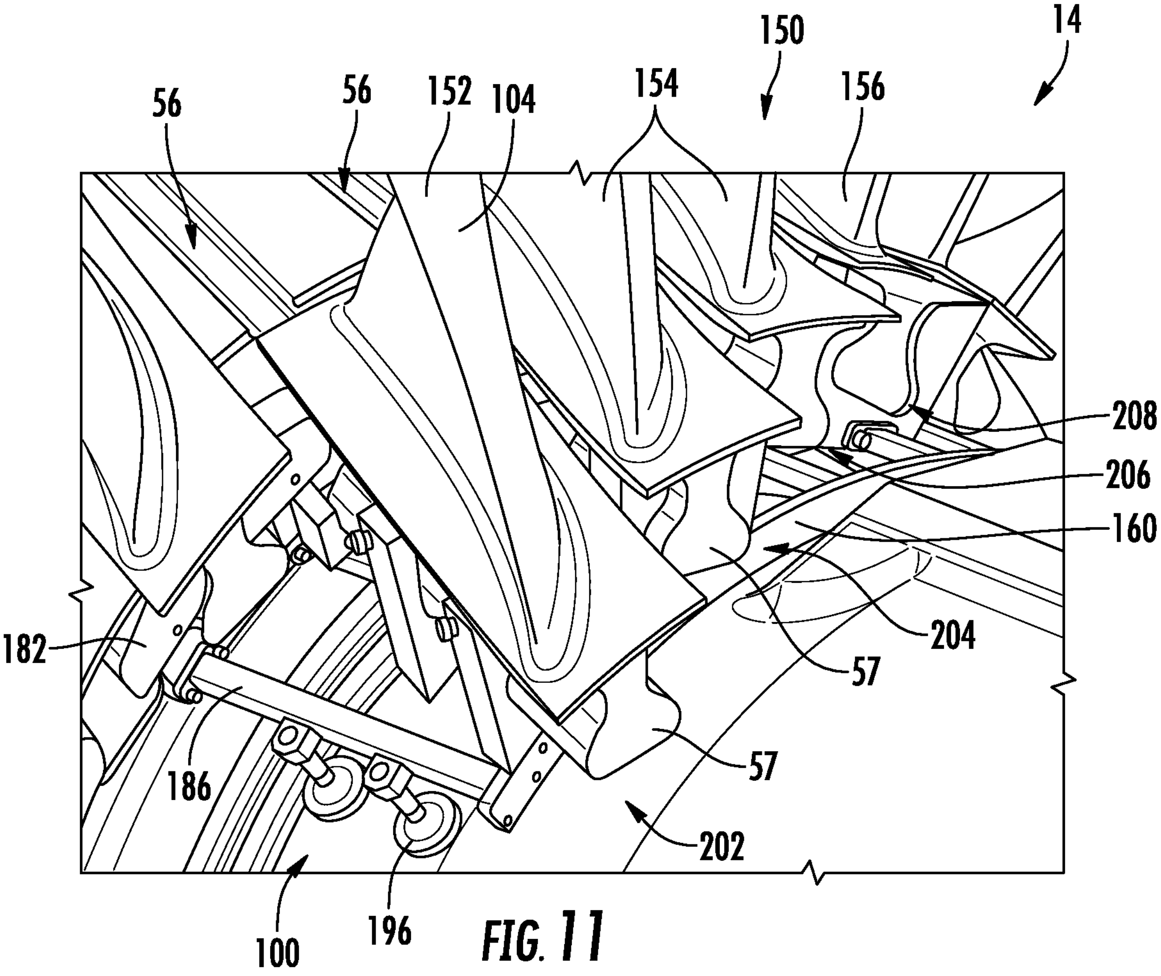
FIG. 11 illustrates a perspective view of a tooling assembly mounted to a compressor and having a series of rotor blades at least partially removed from the rotor disk and disposed at least partially in rows of the tooling assembly in accordance with embodiments of the present disclosure.
Figure 12:
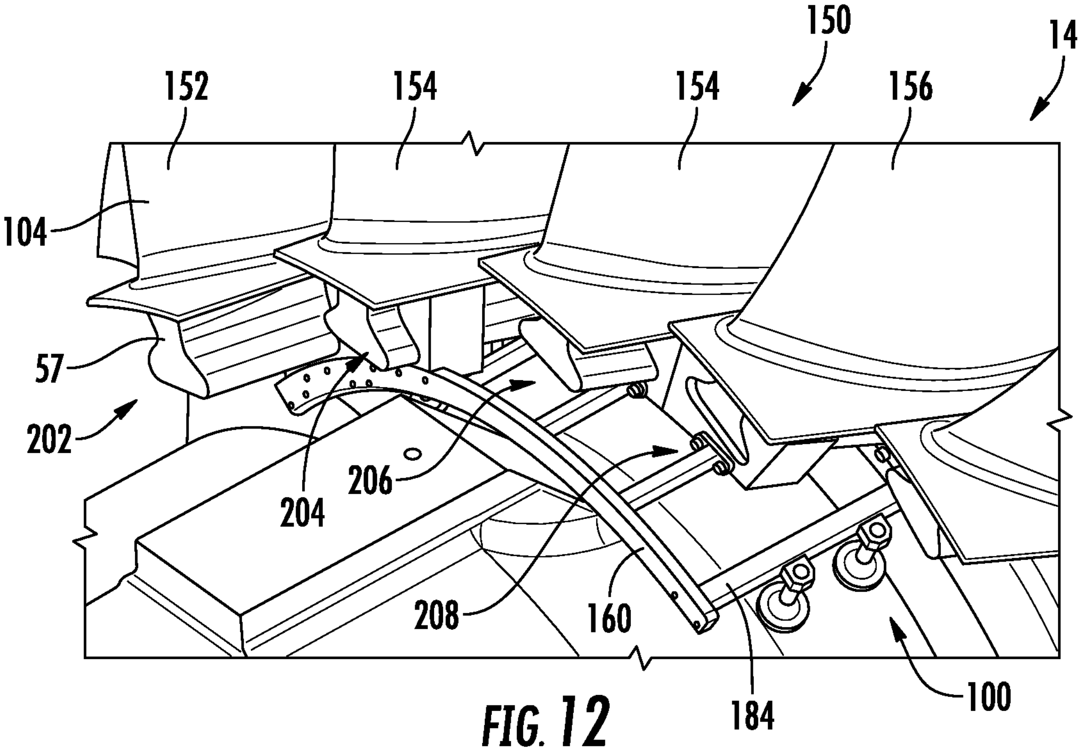
FIG. 12 illustrates a perspective view of a tooling assembly mounted to a compressor and having a series of rotor blades at least partially removed from the rotor disk and disposed at least partially in rows of the tooling assembly in accordance with embodiments of the present disclosure.
Figure 13:
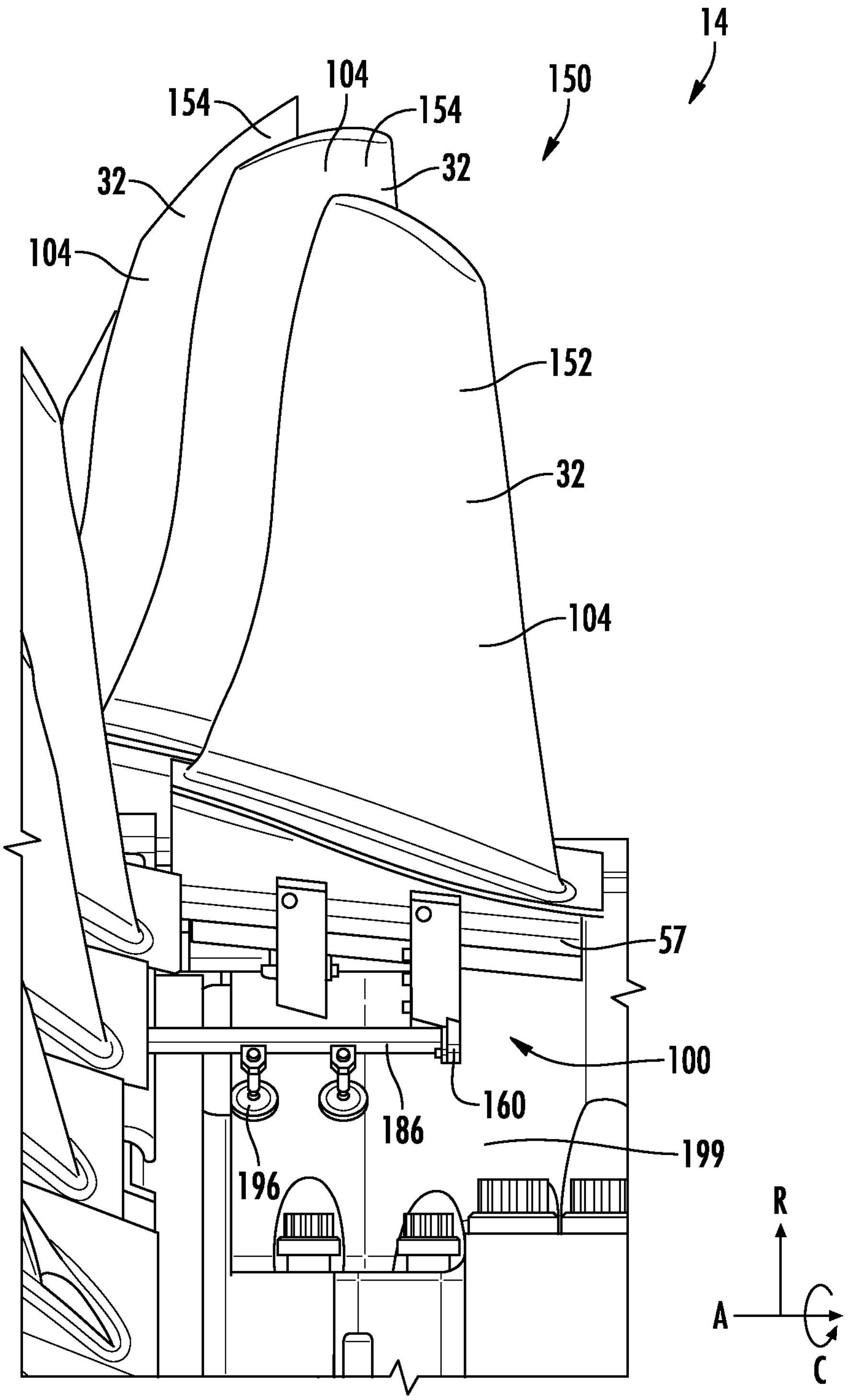
FIG. 13 illustrates a perspective view of a tooling assembly mounted to a compressor and having a series of rotor blades at least partially removed from the rotor disk and disposed at least partially in rows of the tooling assembly in accordance with embodiments of the present disclosure.

FIGS. 11 through 13 each illustrate a perspective view of a tooling assembly 100 mounted to a compressor 14 and having the series of rotor blades 150 at least partially removed from the rotor disk 28 and disposed at least partially in the rows of the tooling assembly. As shown, each row 202, 204, 206, 208 of blocks 164 may hold a respective rotor blade 32 of the plurality of rotor blades 32. As will be discussed below in further detail, the tooling assembly 100 may be removably mounted to the bearing casing 199 of the compressor 14, and one or more rotor blades 32 in a series of rotor blades 150 (e.g., in the first stage) may be removed from a rotor disk 28 by sliding each of the rotor blades 32 into one or more blocks 164 defining a row 202, 204, 206, 208. Each row 202, 204, 206, 208 may be configured to hold a singular rotor blade 32.

Figure 14:
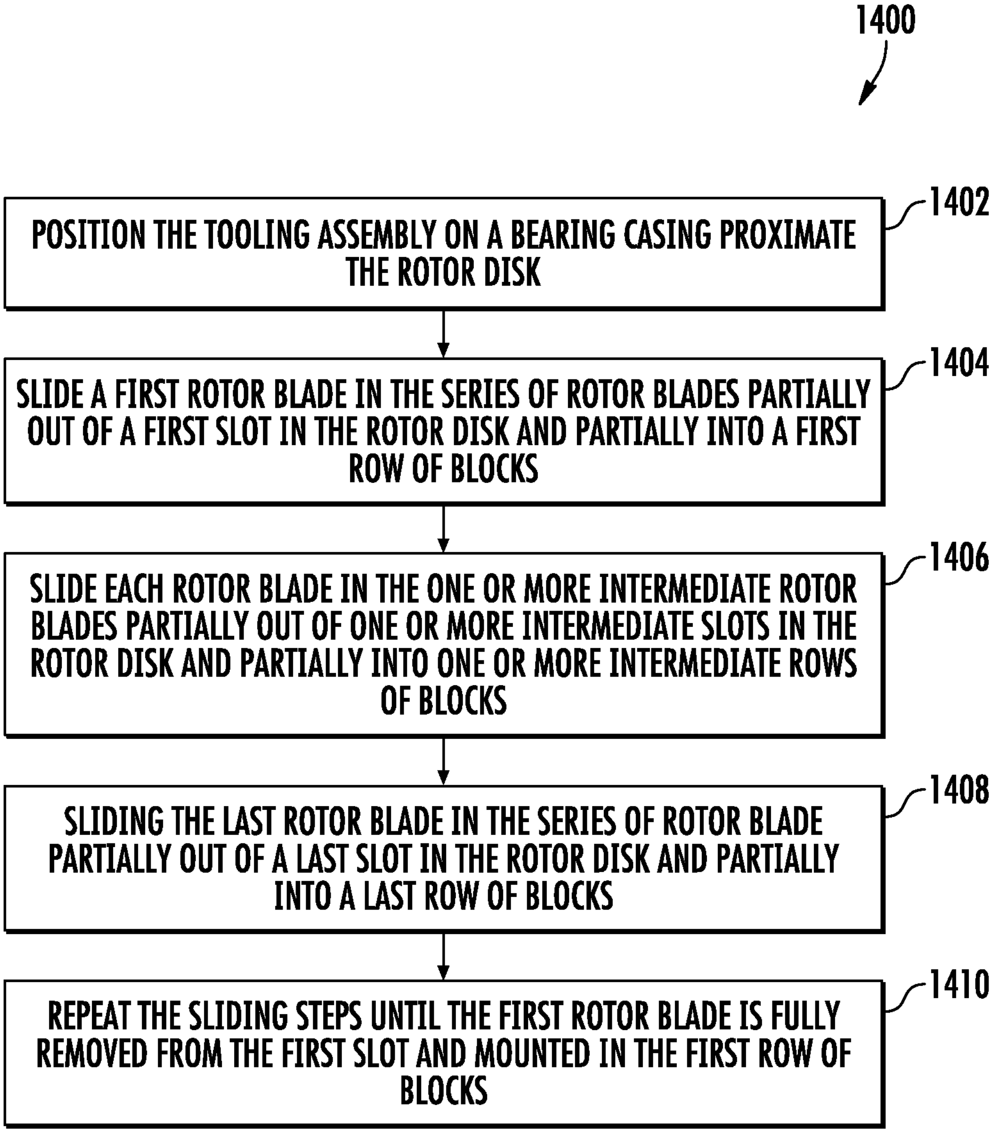
FIG. 14 illustrates a flow chart of a method of removing a rotor blade in a series of rotor blades from a rotor disk of a turbomachine using a tooling assembly, in accordance with embodiments of the present disclosure.

Referring now to FIG. 14, a flow diagram of one embodiment of a method 1400 of removing a rotor blade in a series of rotor blades from a rotor disk of a turbomachine using a tooling assembly is illustrated in accordance with aspects of the present subject matter. In general, the method 1400 will be described herein with reference to the gas turbine 10, the compressor 14, and the tooling assembly 100 described above with reference to FIGS. 1 through 13. However, it will be appreciated by those of ordinary skill in the art that the disclosed method 1400 may generally be utilized with any suitable turbomachine and/or may be utilized in connection with a system having any other suitable system configuration. In addition, although FIG. 14 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown, the series of rotor blades described in the context of the method 1400 may include a first rotor blade, a last rotor blade, and one or more intermediate rotor blades (such as two intermediate rotor blades) disposed between the first rotor blade and the last rotor blade. The method 1400 may include at (1402) positioning the tooling assembly on a bearing casing proximate the rotor disk. In various implementations, positioning the tooling assembly on a bearing casing proximate the rotor disk further comprises circumferentially moving each protrusion of the plurality of protrusions into a respective groove defined by a hook of the rotor disk. For example, as shown by comparing FIGS. 9 and 10, during the installation of the tooling assembly 100, the first plate 158 may be positioned such that the protrusions 176 are disposed between the hooks 182. Subsequently, as shown in FIG. 10, the tooling assembly 100 may be moved circumferentially such that each protrusion 176 is moved into a respective groove 226 until the hole 177 defined through the protrusion aligns with the aperture 228 defined through the hook. Next, the quick release pin 180 may be inserted through the aperture 228 and into the hole 177, thereby coupling the tooling assembly 100 to the rotor disk 28. For example, the method 1400 may further include inserting a quick release pin through a hole defined in a hook of the plurality of hooks and into a protrusion of the plurality of protrusions.

In many implementations, the method 1400 may further include at (1404) sliding a first rotor blade in the series of rotor blades partially out of a first slot in the rotor disk and partially into a first row of blocks. For example, the first rotor blade may be moved (or slid) into an opening defined by the blocks in the first row. For example, sliding at (1404) may include sliding the first rotor blade in the series of rotor blades a first distance (with the first distance being the largest distance).

The method 1400 may further include at (1406) sliding each rotor blade in the one or more intermediate rotor blades partially out of one or more intermediate slots in the rotor disk and partially into one or more intermediate rows of blocks. For example, the intermediate rotor blades may be moved (or slid) into an opening defined by the blocks in the intermediate rows of blocks. For example, sliding at (1406) may include sliding the intermediate rotor blade in the series of rotor blades an intermediate distance that is smaller than the distance the first rotor blade was moved or slid.

The method 1400 may further include at (1408) sliding the last rotor blade in the series of rotor blade partially out of a last slot in the rotor disk and partially into a last row of blocks. For example, the last rotor blade may be moved (or slid) into an opening defined by the blocks in the last row of blocks. For example, sliding at (1408) may include sliding the last rotor blade in the series of rotor blades a last distance. The last distance being the smallest or shortest distance compared to the first distance the first rotor blade is moved and the intermediate distance the intermediate rotor blades are moved.

In exemplary implementations, the method 1400 may further include at (1410) repeating steps 1404 through 1408 until the first rotor blade is fully removed from the first slot and mounted in the first row of blocks. In this way, removing the first rotor blade may be an iterative process in order to avoid collision of neighboring airfoils. For example, referring back to FIG. 2 briefly, when the first rotor blade 152 is fully removed from the slot 56 and held within the tooling assembly 100, the other rotor blades 32 in the series of rotor blades 32 may still be at least partially disposed within the respective slots 56. Removing the first rotor blade 152 is an iterative process in order to avoid airfoil collisions. For example, when removing the first rotor blade 152 in the series of rotor blades 150, the first rotor blade 152 is moved a first distance, then a second rotor blade in the series of rotor blades 150 is moved a second distance shorter than the first distance, then the third rotor blade in the series of rotor blades 150 is moved a third distance shorter than the second distance, then the last rotor blade 156 in the series of rotor blades 150 is moved a last distance shorter than the third distance. This process is repeated until the first rotor blade 152 is removed from the rotor disk 28 and is positioned within the tooling assembly 100.

In some embodiments, in order to mount the first rotor blade in the first row of blocks, the method 1400 may include securing the first rotor blade in the first row of blocks with one or more locking pins. For example, the one or more locking pins may extend through one or more blocks in the first row of blocks. The one or more locking pins may be threadably coupled to the one or more blocks in the first row of blocks, such that rotation of the locking pins moves their position. The one or more locking pins may be rotated until the one or more locking pins contact the first rotor blade, thereby securing the first rotor blade to the blocks of the tooling assembly.

In various implementations, after the first rotor blade is fully removed (e.g., after step 1410) the method 1400 may further include sliding the one or more intermediate rotor blades out of the one or more intermediate blocks and back into the one or more intermediate slots. Similarly, the method 1400 may further include sliding the last rotor blade out of the last block and back into the last slot once the first rotor blade is fully removed. Thereafter, the tooling assembly may be decoupled from the compressor 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A tooling assembly for removal of a rotor blade from a rotor disk of a turbomachine, the tooling assembly comprising: a first plate; a second plate spaced apart from the first plate; one or more members extending between the first plate and the second plate; and a plurality of blocks mounted to the one or more members and arranged in one or more rows between the first plate and the second plate, wherein at least one block in the plurality of blocks defines an opening that corresponds with an exterior shape of a mounting portion of the rotor blade.

The tooling assembly as in any of the preceding claims, wherein the first plate and the second plate each extend circumferentially from a first end to a second end.

The tooling assembly as in any of the preceding claims, further comprising leveling feet extending radially from at least one member of the one or more members.

The tooling assembly as in any of the preceding claims, wherein the one or more members comprises a plurality of row members extending from one of a first block of the plurality of blocks, the first plate, or the second plate to one of a second block of the plurality of blocks, the first plate, or the second plate.

The tooling assembly as in any of the preceding claims, wherein the one or more members comprises a first external member and a second external member each extending from the first plate to the second plate.

The tooling assembly as in any of the preceding claims, wherein the one or more rows comprises a first row of blocks, one or more intermediate rows of blocks, and a last row of blocks.

The tooling assembly as in any of the preceding claims, wherein each block in the first row of blocks defines a U-shape, and wherein each block in last row of blocks and each block in the one or more intermediate rows of blocks defines an opening that corresponds with an exterior shape of a mounting portion of the rotor blade.

The tooling assembly as in any of the preceding claims, wherein the first row of blocks circumferentially neighbors one intermediate row of blocks of the one or more intermediate rows of blocks.

The tooling assembly as in any of the preceding claims, wherein a locking pin extends one or more blocks of the plurality of blocks.

The tooling assembly as in any of the preceding claims, wherein one or more quick release pins extends through one of the first plate or the second plate to couple the tooling assembly to the rotor disk.

The tooling assembly as in any of the preceding claims, wherein the first plate includes a main body and a protrusion extending radially from the main body, and wherein the one or more quick release pins extend through the protrusion of the first plate.

The tooling assembly as in any of the preceding claims, wherein the rotor blade is a compressor rotor blade in a first stage of the compressor.

A method of removing a rotor blade in a series of rotor blades from a rotor disk of a turbomachine using a tooling assembly, the series of rotor blades comprising a first rotor blade, a last rotor blade, and one or more intermediate rotor blades, the method comprising: positioning the tooling assembly on a bearing casing proximate the rotor disk; sliding a first rotor blade in the series of rotor blades partially out of a first slot in the rotor disk and partially into a first row of blocks; sliding each rotor blade in the one or more intermediate rotor blades partially out of one or more intermediate slots in the rotor disk and partially into one or more intermediate rows of blocks; sliding the last rotor blade in the series of rotor blade partially out of a last slot in the rotor disk and partially into a last row of blocks; and repeating steps (b) through (d) until the first rotor blade is fully removed from the first slot and mounted in the first row of blocks.

The method as in any of the preceding claims, wherein the tooling assembly comprises a first plate, a second plate spaced apart from the first plate, and one or more members extending between the first plate and the second plate.

The method as in any of the preceding claims, wherein the rotor disk further comprises a plurality of hooks each defining a groove, and wherein the first plate comprises a main body and a plurality of protrusions extending from the main body.

The method as in any of the preceding claims, wherein positioning the tooling assembly on a bearing casing proximate the rotor disk further comprises circumferentially moving each protrusion of the plurality of protrusions into a respective groove.

The method as in any of the preceding claims, further comprising inserting a quick release pin through a hole defined in a hook of the plurality of hooks and into a protrusion of the plurality of protrusions.

The method as in any of the preceding claims, wherein mounting the first rotor blade in the first row of blocks comprises securing the first rotor blade in the first row of blocks with one or more locking pins.

The method as in any of the preceding claims, wherein after the first rotor blade is fully removed, the method further comprises sliding the one or more intermediate rotor blades out of the one or more intermediate rows of blocks and back into the one or more intermediate slots.

The method as in any of the preceding claims, further comprising sliding the last rotor blade out of the last block and back into the last slot.

What is claimed is:

1. A tooling assembly for removal of a rotor blade from a rotor disk of a turbomachine, the tooling assembly comprising:

a first plate;

a second plate spaced apart from the first plate;

one or more members extending between the first plate and the second plate, the one or more members including at least one external member extending from the first plate to the second plate; and a plurality of blocks mounted to the one or more members and arranged in one or more rows between the first plate and the second plate, wherein the plurality of blocks include a forward block, a middle block, and an aft block, wherein the one or more members comprises a plurality of row members extending from one of the first plate or the second plate to the middle block, wherein at least one row of the one or more rows includes the forward block coupled to the first plate, the middle block disposed between the first plate and the second plate, and the aft block coupled to the second plate, and wherein at least one block in the plurality of blocks defines an opening that corresponds with an exterior shape of a mounting portion of the rotor blade.

2. The tooling assembly as in claim 1, wherein the first plate and the second plate each extend circumferentially from a first end to a second end.

3. The tooling assembly as in claim 1, further comprising leveling feet extending radially from at least one member of the one or more members.

4. The tooling assembly as in claim 1, wherein the one or more rows comprises a first row of blocks, one or more intermediate rows of blocks, and a last row of blocks.

5. The tooling assembly as in claim 4, wherein each block in the first row of blocks defines a U-shape, and wherein each block in last row of blocks and each block in the one or more intermediate rows of blocks defines the opening that corresponds with the exterior shape of the mounting portion of the rotor blade.

6. The tooling assembly as in claim 4, wherein the first row of blocks circumferentially neighbors one intermediate row of blocks of the one or more intermediate rows of blocks.

7. The tooling assembly as in claim 1, wherein a locking pin extends one or more blocks of the plurality of blocks.

8. The tooling assembly as in claim 1, wherein one or more quick release pins extends through one of the first plate or the second plate to couple the tooling assembly to the rotor disk.

9. The tooling assembly as in claim 8, wherein the first plate includes a main body and a protrusion extending radially from the main body, and wherein the one or more quick release pins extend through the protrusion of the first plate.

10. The tooling assembly as in claim 1, wherein the rotor blade is a compressor rotor blade in a first stage of the compressor.

11. A method of removing a rotor blade in a series of rotor blades from a rotor disk of a turbomachine using a tooling assembly, the series of rotor blades comprising a first rotor blade, a last rotor blade, and one or more intermediate rotor blades, the method comprising:

(a) positioning the tooling assembly on a bearing casing proximate the rotor disk, the tooling assembly including a plurality of blocks arranged in one or more rows between a first plate and a second plate spaced apart from the first plate, wherein one or more members extend between the first plate and the second plate, the one or more members including at least one external member extending from the first plate to the second plate, wherein the plurality of blocks include a forward block, a middle block, and an aft block, wherein the one or more members comprises a plurality of row members extending from one of the first plate or the second plate to the middle block, wherein at least one row of the one or more rows include the forward block coupled to the first plate, the middle block disposed between the first plate and the second plate, and the aft block coupled to the second plate;

(b) sliding the first rotor blade in the series of rotor blades partially out of a first slot in the rotor disk and partially into an opening in a first row of blocks of the rows of blocks;

(c) sliding each rotor blade in the one or more intermediate rotor blades partially out of one or more intermediate slots in the rotor disk and partially into an opening in one or more intermediate rows of blocks of the rows of blocks;

(d) sliding the last rotor blade in the series of rotor blades partially out of a last slot in the rotor disk and partially into an opening in a last row of blocks of the rows of blocks; and (e) repeating steps (b) through (d) until the first rotor blade is fully removed from the first slot and mounted in the first row of blocks.

12. The method as in claim 11, wherein the rotor disk further comprises a plurality of hooks each defining a groove, and wherein the first plate comprises a main body and a plurality of protrusions extending from the main body.

13. The method as in claim 12, wherein positioning the tooling assembly on a bearing casing proximate the rotor disk further comprises circumferentially moving each protrusion of the plurality of protrusions into a respective groove.

14. The method as in claim 13, further comprising inserting a quick release pin through a hole defined in a hook of the plurality of hooks and into a protrusion of the plurality of protrusions.

15. The method as in claim 11, wherein mounting the first rotor blade in the first row of blocks comprises securing the first rotor blade in the first row of blocks with one or more locking pins.

16. The tooling assembly as in claim 1, wherein the forward block, the middle block, and the aft block are axially spaced apart from one another.

17. The tooling assembly as in claim 1, wherein the forward block is coupled to the first plate and a first member of the one or more members, the middle block is coupled to the first member and a second member of the one or more members, and the aft block is coupled to the second plate and the second member of the one or more members.

* * * * *